June 13, 1933. J. P. HIGH 1,913,806
WATER CONTAINER
Filed Dec. 28, 1931

Inventor
James P. High
By C. A. Snow & Co.
Attorneys.

Patented June 13, 1933

1,913,806

UNITED STATES PATENT OFFICE

JAMES P. HIGH, OF WICHITA, KANSAS

WATER CONTAINER

Application filed December 28, 1931. Serial No. 583,482.

The device forming the subject matter of this application is a domestic utensil embodying a container for water and the like, and the invention aims to provide novel means whereby the container is adapted for suspension from the front of a gas stove or the like, to bring about a heating of the water in the container.

In the accompanying drawing:—

Figure 1:
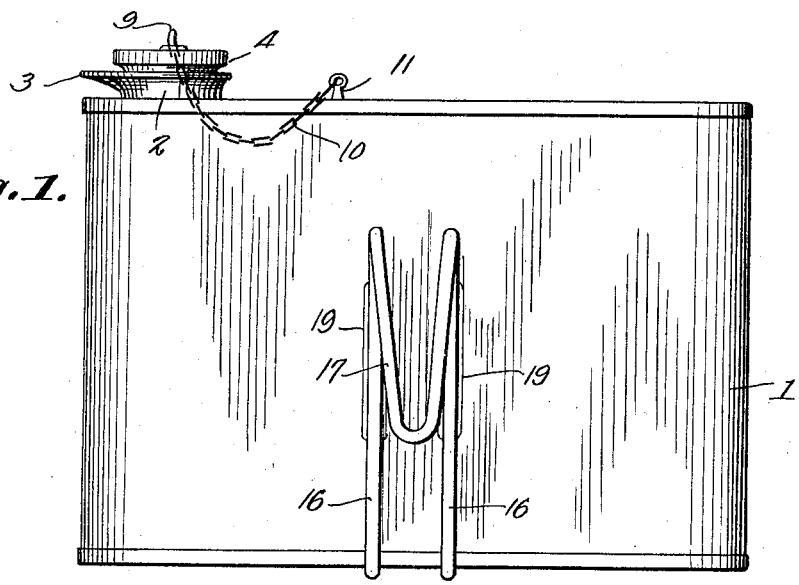
Fig. 1 shows in side elevation, a device constructed in accordance with the invention.

In carrying out the invention, there is provided a container 1, which may be of any desired shape, the container, preferably, being a flat, oblong metal can, with parallel sides. The top of the container 1 carries an upstanding neck 2 provided with an outwardly extended pouring spout 3, extended toward one end of the container. A stopper 4, preferably made of metal, is threaded or secured otherwise in the neck 2. The stopper 4 has an eye 9, to which is connected one end of a flexible element 10, such as a chain, the opposite end of the flexible element being secured, in any suitable way, as indicated at 11, to the top of the container 1.

The container 1 may be suspended on the forwardly projecting front bar 12 of a gas or similar heater 14. With this end in view, there is provided a bracket 15, made out of a single piece of metal, such as stiff wire, the one-piece bracket comprising two U-shaped parts 16, located side by side, the U-shaped parts being connected at one end by a downwardly extended, U-shaped handle 17. The rear or opposite ends of the U-shaped parts 16 of the bracket 15 are formed into downwardly-extended hooks 18. The container 1 fits closely within the U-shaped parts 16, and is permanently secured thereto by solder, as shown at 19.

Figure 2:
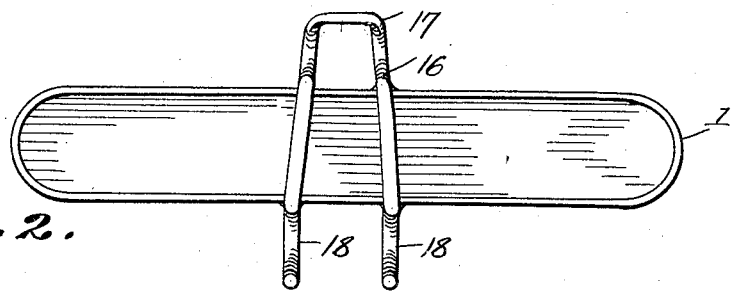
Fig. 2 is a bottom plan.
Figure 3:
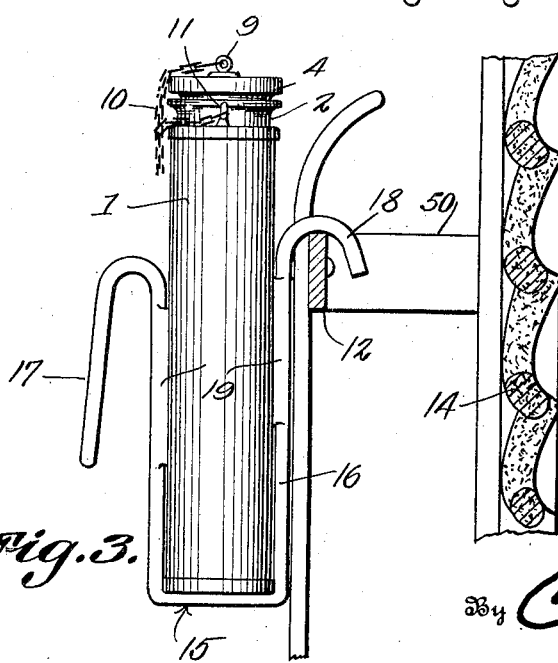
Fig. 3 is an elevation wherein the device is shown suspended on a gas heater.

The free-ended suspension hooks 18 are adapted to be engaged over the horizontal part 12 of the heater 14, as shown in Fig. 3, and the container 1 is held in such a position that its contents will be brought quickly to a high temperature, by the heater 14. The suspension hooks 18 are spaced apart transversely throughout their entire extent, as shown in Fig. 2, to clear transverse part 50 (Fig. 3) of the heater 14. It is to be observed that the back portions of the U-shaped parts 16 are somewhat longer than the front portions thereof. This causes the hooks 18 to be located somewhat higher than the top of the handle 17. The operator, if he wishes, can reverse the utensil, side for side, from the position of Fig. 3, the front bar 12 being engaged with the handle 17, the handle being so shaped that it can be used as a suspension element when the utensil is reversed. This will raise the container 1 slightly. The operator, in view of the foregoing, can suspend the container 1 at two different heights, and this is often convenient because there may be something under the container 1 which would prevent the hooks 18 from being used as shown in Fig. 2. Moreover, because the handle 17 and the suspension hooks 18 are located at different elevations, not only is the utensil accommodated to pecularities of heater construction, but it is possible also to adjust the container 1 vertically, when it is hung up, the container may be placed in a better position than would be possible otherwise, with respect to the source of heat, it being obvious that all heaters adapted for use with the invention are not constructed exactly as shown in Fig. 3.

The device may be used to heat water for shaving or washing, to make tea, coffee and the like, for simple cooking, and for many other purposes which will suggest themselves readily to the user. The device, for instance, is useful as a humidifier.

Having thus described the invention, what is claimed is:—

In a domestic utensil, adapted for suspension from a horizontal part on a heater, a one-piece bracket comprising two U-shaped parts located side by side, a container fitting closely in said U-shaped parts and secured permanently thereto, the U-shaped parts being connected at one end by a downwardly-extended U-shaped handle, the opposite ends of the U-shaped parts of the bracket being formed into downwardly-extended free-ended suspension hooks, adapted to be engaged over a horizontal part on a heater, the suspension hooks being spaced apart transversely throughout their entire extent, to clear transverse parts of the heater, the handle being so shaped that it can be used as a suspension element when the utensil is reversed, side for side, the handle and the suspension hooks being located at different elevations to accommodate the utensil to pecularities of heater construction, and to adjust the container vertically with respect to the source of heat.

In testimony that I claim the foregoing as my own, I have hereto affixed my signature.

JAMES P. HIGH.